Dec. 24, 1957   R. H. AMUNDSON   2,817,794
TRANSFORMER OVERLOAD PROTECTION
Filed Sept. 9, 1955   2 Sheets-Sheet 1
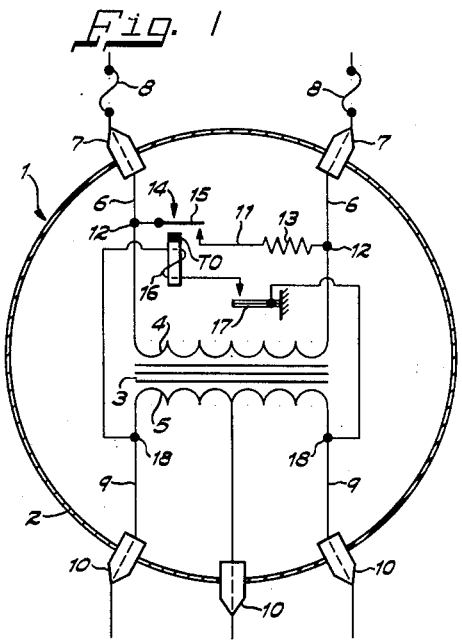
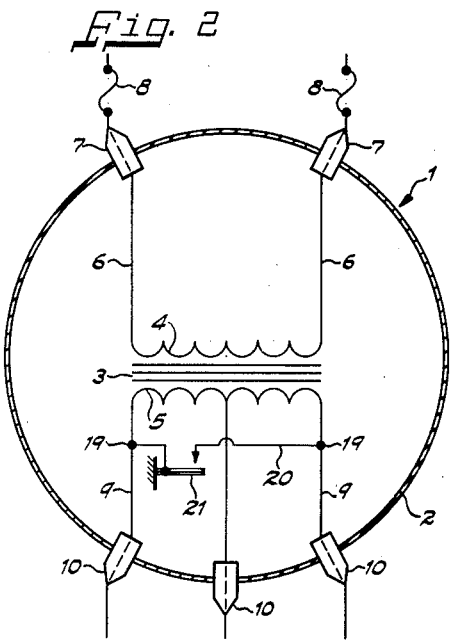
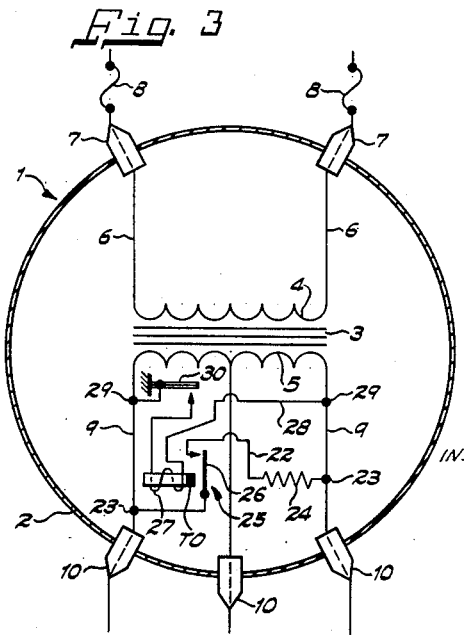
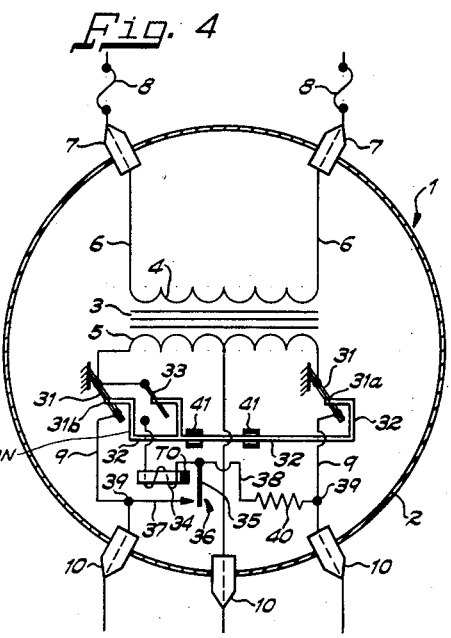
INVENTOR.
Roald H. Amundson
BY Lee H. Kaiser
Attorney Dec. 24, 1957  R. H. AMUNDSON  2,817,794
TRANSFORMER OVERLOAD PROTECTION
Filed Sept. 9, 1955  2 Sheets-Sheet 2

INVENTOR.
Roald H. Amundson
BY Lee H Kaiser
Attorney

United States Patent Office 2,817,794
Patented Dec. 24, 1957

2,817,794

TRANSFORMER OVERLOAD PROTECTION

Roald H. Amundson, Milwaukee, Wis., assignor to McGraw-Edison Company, a corporation of Delaware Application September 9, 1955, Serial No. 533,393

7 Claims. (Cl. 317—14)

This invention relates to protective equipment for electrical apparatus and more particularly to apparatus for protecting electrical transformers from excessive overload sustained for too long a time.

The present application is a continuation-in-part of my application Serial No. 254,920, filed November 5, 1951, now abandoned, and having the same assignee as the present invention.

It is an object of the invention to provide a novel and efficient arrangement for the protection of stationary induction apparatus.

It is a further object of the invention to provide an electrical transformer protective arrangement utilizing overcurrent and overtemperature responsive devices within the transformer casing which control the operation of interrupting devices external of the casing where they are easily replaced or reset.

It is a still further object of the invention to provide a protective arrangement for electrical transformers permitting utilization of circuit interrupting devices in the primary leads external of the transformer casing which arrangement is responsive to both temperature of the insulating liquid within the casing and the current flowing in the transformer secondary.

Other objects and advantages of the invention will be apparent from the following description when taken in conjunction with the accompanying drawing wherein:

Fig. 1 is a diagrammatic top view through a transformer casing illustrating a preferred embodiment of the invention;

Figs. 2 and 3 are diagrammatic top views through a transformer casing similar to Fig. 1 and showing alternative embodiments of the invention;

Fig. 4 is a diagrammatic top view through a transformer casing and showing an embodiment which is responsive to both the temperature of the insulating liquid and the current flowing in the transformer secondary.

Figure 5:
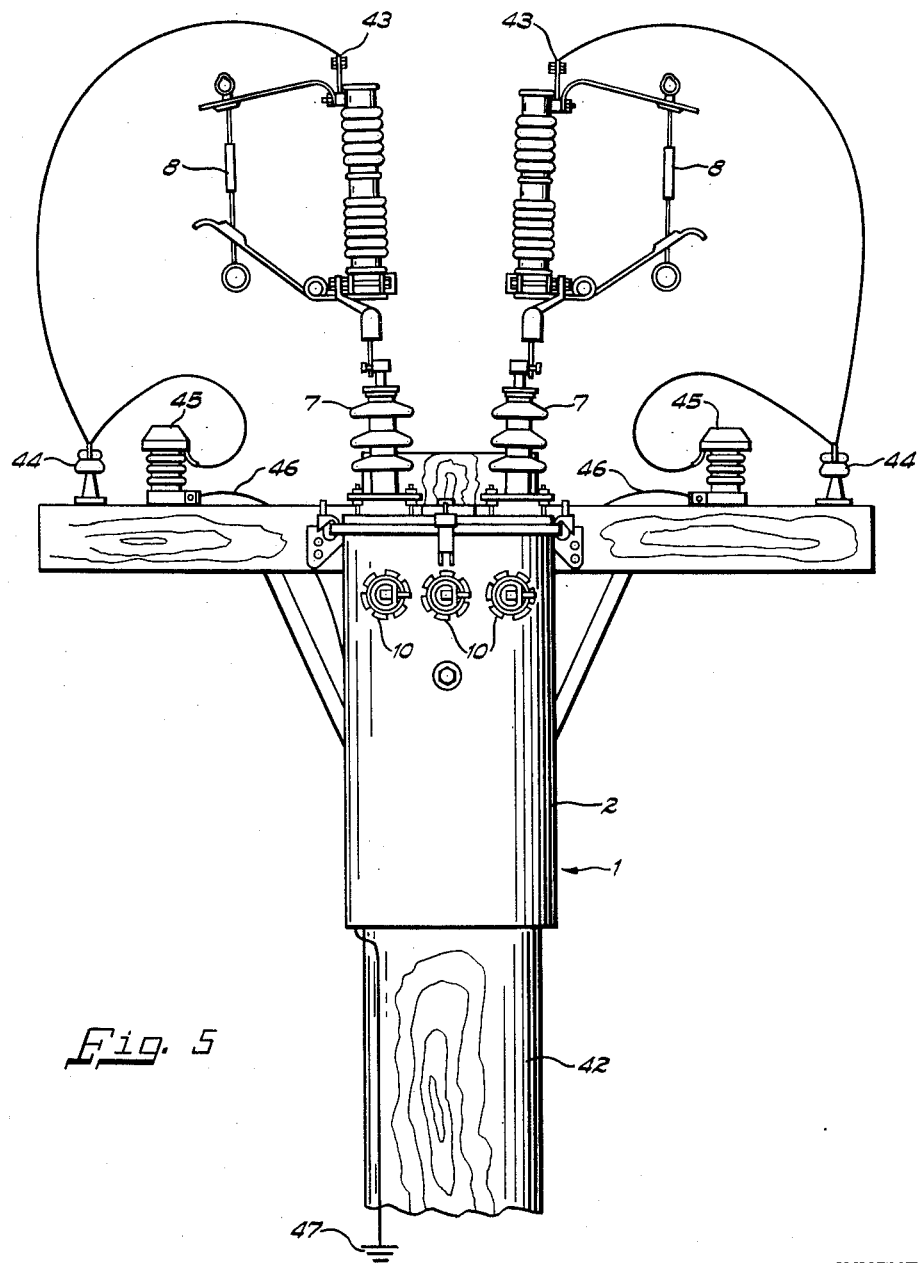
Fig. 5 illustrates a pole mounted transformer embodying the invention provided with standard fuse links exterior of the transformer casing.

Referring to the drawing and in particular to Fig. 1, an electrical transformer 1 includes a casing 2 which encloses a magnetic core 3 immersed in insulating liquid within casing 2 and about which are wound a high voltage winding 4 and a low voltage winding 5. Primary leads 6 connect the high voltage winding 4 to primary bushings 7 which are mounted on the casing 2, and fuse links 8 are preferably mounted on the bushings 7 external of the casing 2 where they are easily replaced. Although the invention comprehends the utilization of any circuit interrupting device in the primary leads 6 and the mounting of the interrupting device either internally or externally of the casing 2, the principle advantages of the invention are obtained when the circuit interrupting device is externally mounted, and in the preferred embodiment fuse links 8 are mounted on the bushings 7 in the manner illustrated in Fig. 5. Secondary leads 9 connect the low voltage winding 5 to the secondary bushings 10 which are mounted on the casing 2 and provide a conducting path through the casing 2.

A conductor 11 joined to the primary leads 6 at points 12 connects the normally open contacts 15 of a slow-to-release relay 14 in shunt to the high voltage winding 4. In the drawing relay 14 is designated TO in order to signify a time delay upon opening of its contacts 15. In certain installations it may be desirable to connect a current limiting resistor 13 in series with the contacts 15. The serial arrangement of the operating coil 16 of the relay 14 and the normally open contacts of a bimetallic switch 17 immersed in the insulating coolant within the casing 2 is connected at points 18 to the secondary leads 9 and in shunt to the low voltage winding 5. Suitable bimetallic switches and slow-to-release relays having a time delay upon opening are well known in the art and are commercially available, and the details of construction thereof have been omitted in order to simplify the drawing and facilitate the understanding of the invention. The temperature of the insulating liquid within casing 2 is raised upon a sustained transformer overload, and bimetallic switch 17 responds to a predetermined temperature of the insulating liquid to close its contacts and thus connect the operating coil 16 of relay 14 across the secondary leads 9, thereby actuating the normally open relay contacts 15 to closed position. Closure of contacts 15 short circuits primary leads 6, thereby causing an increased current to flow through the primary fuse links 8, the magnitude of which is determined by the value of the current limiting resistance 13. Normally the impedance of high voltage winding 4 limits the magnitude of the current flowing through fuse links 8. A sustained excessive overload on the transformer resulting in overheating of the insulating liquid causes bimetal switch 17 to close its contacts to operate relay 14, thereby short circuiting high voltage winding 4 through relay contacts 15 and current limiting resistor 13 and causing a sufficiently large current to flow to rupture fuse links 8.

Although closure of relay contacts 15 short circuits primary winding 4 and reduces the voltage below that required to maintain relay 14 actuated, the slow-to-release relay 14 provides a time delay in opening and maintains relay contacts 15 closed for a sufficient length of time to assure the rupture of fuse links 8.

Although in the embodiment of Fig. 1 the bimetallic switch 17 is illustrated and described as being responsive only to ambient temperature in the transformer, it will be apparent that the invention also comprehends connecting the thermally responsive element of the bimetallic switch 17 in series with the low voltage winding 5 so that it is responsive to both transformer secondary current and to overtemperature of the insulating liquid.

In an alternative embodiment of the invention shown in Fig. 2, the low voltage winding 5 is short-circuited upon excessive overheating of the transformer in order to rupture the fuse links 8 in the primary line leads and thus disconnect the transformer. A bimetal switch 21 immersed in the transformer oil has a pair of normally open contacts connected by conductor 20 to the secondary leads 9 at points 19 and in shunt to the low voltage winding 5. Excessive overload on the transformer causing overheating of the transformer oil actuates bimetal switch 21 to closed position, thereby short circuiting low voltage winding 5 and causing a sufficiently large current to flow in the primary winding 4 to rupture the fuse links 8. The current interrupting rating of the fuse links 8 in the embodiment of Fig. 2 wherein the impedance of the high voltage winding 4 limits the magnitude of the primary current is considerably less than in the embodiment of Fig. 1 wherein the high voltage winding 4 is short circuited directly. It will be apparent that bimetallic switch 21 can be connected in a secondary lead 9 in series with the low voltage winding 5 if it is desirable to have the embodiment of Fig. 2 responsive both to ambient temperature within the transformer and transformer secondary current.

Another embodiment of the invention illustrated in Fig. 3 is particularly suitable for the protection of transformers of such size that the bimetal switch 21 of Fig. 2 is incapable of carrying the current resulting from short circuiting secondary winding 5. The normally open contacts 26 of a slow-to-release relay 25 are connected by conductor 22 to the secondary leads 9 at points 23 and in shunt to the low voltage winding 5. In certain installations it may be desirable to connect a current limiting resistor 24 in series with the contacts 26. The serial arrangement of the operating coil 27 of relay 25 and the normally open contacts of a bimetallic switch 30 immersed in the transformer oil within the casing 2 are connected by the conductor 28 to the secondary leads 9 at points 29 and in shunt to the low voltage winding 5. Excessive overload resulting in overheating of the transformer oil actuates bimetal switch 30 to closed position, thereby connecting relay operating coil 27 across secondary leads 9. Operation of relay 25 closes contacts 26, thereby short-circuiting low voltage winding 5 through conductor 22 and current limiting resistor 24. Short circuiting low voltage winding 5 causes sufficiently large current to flow in the high voltage winding 4 to rupture the fuse links 8 and thus remove the transformers from service.

Closure of contacts 26 also short circuits operating coil 27 of relay 25, but slow-to-release relay 25 has a time delay upon opening and maintains contacts 26 closed for a sufficient length of time to rupture fuse links 8. If desired bimetallic switch 30 can be connected in series with low voltage winding 5 to provide a protective arrangement that is responsive to both ambient temperature in the transformer and to the magnitude of transformer secondary current.

The embodiment of the invention illustrated in Fig. 4 is responsive to both overtemperature of the insulating fluid within casing 2 and to excessive secondary current to remove the transformer from service. A thermally responsive electrical switch within casing 2 comprises a pair of bimetallic elements 31 immersed in the insulating fluid each of which is connected in one of the secondary leads 9, a pair of normally open contacts 33, and an insulating linkage 32 movable in bearings 41 and operatively connected to both bimetallic elements 31 at points 31a and 31b and to the movable one of the contacts 33. The thermally responsive elements 31 move in unison through the medium of the linkage 32 to actuate contacts 33 between open and closed positions. Thermally responsive elements 31 normally retain linkage 32 in a position wherein switch contacts 33 are open. Linkage 32 is movable by either bimetallic element 31 in response to a predetermined overload current through the secondary leads 9 and also in response to a predetermined overtemperature of the insulating fluid to a position wherein contacts 33 are closed.

The serial arrangement of switch contacts 33 and the operating coil 34 of a slow-to-release relay 36 are connected by conductor 38 to the secondary leads 9 at points 39 and in shunt to the low voltage winding 5. The normally open contacts 35 of relay 36 are connected by conductors 37 and 38 to the secondary leads 9 at points 39 and in shunt to the low voltage winding 5. In certain installations a current limiting resistor 40 may be connected in lead 38 to limit the magnitude of the current through contacts 35 when relay 36 is operated.

Flexure of either bimetallic element 31 in response to a predetermined overtemperature of the insulating liquid or in response to a predetermined overload current in a secondary lead 9 actuates linkage 32 to close contacts 33, thereby connecting relay operating coil 34 across secondary leads 9. Operation of relay 36 closes relay contacts 35, thereby short circuiting low voltage winding 5 and causing a sufficiently large current to flow in primary winding 4 to rupture fuse links 8.

Although closure of contacts 35 reduces the voltage below that required to maintain relay 36 operated, slow-to-release relay 36 provides a time delay in opening its contacts and thus maintains contacts 35 closed for a sufficient length of time to rupture fuse links 8.

Fig. 5 illustrates a transformer embodying the invention mounted on a pole 42 and having conventional fuses 8 mounted on the primary transformer cover bushings 7. One lead connected to fuse 8 at 43 is connected to the power line at the insulator 44 on the cross bar. Another conductor from the insulator 44 connects with a spark gap 45 mounted on the cross bar and having a lead grounded at 46.

Since the protective arrangement of the invention utilizes standard fuses 8 located exterior of the transformer casing 2, it is unnecessary to remove the transformer cover to return the transformer to service. Mere replacement of the ruptured fuse restores the transformer to service.

Although the invention has been described and illustrated as including a fuse link as the circuit interrupter, the protective arrangement of the invention operates satisfactorily with any type of current sensitive device, e. g., a circuit breaker, in a primary lead.

While only a few embodiments of the invention have been illustrated and described, it will be appreciated that they are intended to be illustrative only and that many variations and modifications thereof will be apparent to those skilled in the art, and it is intended in the appended claims to cover all such modifications and variations as fall within the true spirit and scope of the invention.

What I claim as new and desire to secure by Letters Patent of the United States is:

1. In combination, an electrical transformer comprising a sealed casing, dielectric fluid within said casing, a primary winding and a secondary winding immersed in said fluid within said casing, a thermally responsive switch having a pair of normally open contacts and being immersed in said fluid within said casing and responsive to a predetermined temperature of said fluid to close said contacts, a slow-to-release relay within said casing having a pair of normally open contacts connected in shunt to one of said windings and an operating coil adapted when energized to close said contacts, said relay being adapted to provide a time delay in the opening of its contacts, the serial arrangement of said operating coil and the contacts of said bimetallic switch being connected in shunt to said secondary winding, and a current responsive circuit interrupter exterior of said casing connected in series with said primary winding and responsive to a predetermined magnitude of current therethrough incident to operation of said relay to interrupt the circuit to said primary winding.

2. In combination, an electrical transformer including a sealed casing, insulating fluid within said casing, a core and coil assembly including a primary winding and a seccondary winding immersed in said fluid within said casing, a current responsive circuit interrupter external of said casing connected in series relation to said primary winding, a bimetallic switch within said casing having a pair of normally open contacts and being responsive to a predetermined temperature of said fluid to close said contacts, and a slow-to-release relay having a pair of normally open contacts and an operating coil adapted when energized to close said contacts, said relay being adapted to provide a delayed opening of its contacts, the serial arrangement of said operating coil and said normally open contacts of said bimetallic switch being connected in shunt to said secondary winding, said contacts of said relay being connected in shunt to said primary winding.

3. In the combination as defined in claim 2 wherein said bimetallic switch includes a thermal element connected in series with said secondary winding and responsive to a predetermined current flow therethrough to close said contacts of said bimetallic switch.

4. In combination, an electrical transformer comprising a sealed casing, dielectric fluid within said casing, a primary winding and a secondary winding immersed in said fluid within said casing, a bimetallic switch within said casing having a pair of normally open contacts and being responsive to a predetermined temperature of said fluid to close said contacts, a slow-to-release relay within said casing having a pair of normally open contacts connected in shunt to said secondary winding and an operating winding adapted when energized to close said contacts, said relay being adapted to provide a time delay in the opening of its contacts, the serial arrangement of said operating coil and the contacts of said bimetallic switch being connected in shunt to said secondary winding, and a current responsive circuit interrupter exterior of said casing connected in series with said primary winding and responsive to a predetermined overload current therethrough incident to operation of said relay to interrupt the circuit to said primary winding.

5. In combination, an electrical transformer comprising a sealed casing, dielectric fluid within said casing, a primary winding and a secondary winding immersed in said fluid within said casing, primary leads and secondary leads extending from said windings through said casing, an electrical switch including a pair of normally open contacts and a pair of thermally responsive elements each of which is immersed in said fluid and connected in series with one of said secondary leads, said switch being responsive to a current of predetermined magnitude through either of said elements and also responsive to a predetermined temperature of said dielectric to close said pair of contacts, a slow-to-release relay having a pair of normally open contacts connected in shunt to said secondary winding and an operating coil adapted when energized to close said relay contacts, the serial arrangement of said operating coil and said switch contacts being connected in shunt to said secondary winding, and a current sensitive interrupter exterior of said casing connected in one of said primary leads and responsive to a predetermined current in said one of said primary leads incident to operation of said relay to disconnect said one of said primary leads.

6. In combination, an electrical transformer comprising a sealed casing, dielectric fluid within the casing, a primary winding and a secondary winding immersed in said fluid within said casing, primary and secondary leads extending from said windings through said casing, a pair of thermally responsive elements within said casing each of which is in series with one of said secondary leads, a linkage operatively connecting both said thermally responsive elements, an electrical switch operatively connected to said linkage and having a pair of normally open contacts, said thermally responsive elements under normal operating conditions maintaining said linkage in a position wherein the contacts of said switch are open and moving in unison through the medium of said linkage when either of said elements moves responsive to a predetermined current through the said secondary leads and also responsive to a predetermined temperature of said dielectric fluid to move said linkage to a position wherein said switch contacts are closed, a slow-to-release relay having a pair of normally open contacts connected in shunt to said secondary winding and an operating coil adapted when energized to close said normally open relay contacts, said relay being adapted to provide a time delay in the opening of its contacts, the serial arrangement of said operating coil and said normally open switch contacts being connected in shunt to said secondary winding, and a current sensitive circuit interrupter exterior of said casing connected in one of said primary leads and responsive to a predetermined current therethrough incident to closure of said relay contact to disconnect said one of said primary leads.

7. In combination, an electrical transformer including a sealed casing, dielectric fluid within said casing, a primary winding and a secondary winding immersed in said fluid within said casing, primary leads and secondary leads extending from said windings through said casing, an electrical switch including a pair of normally open contacts and a thermally responsive element immersed in said fluid and connected in series with one of said secondary leads, said switch being responsive to a current of predetermined magnitude through said element and also responsive to a predetermined temperature of said dielectric fluid to close said pair of contacts, a slow-to-release relay having a pair of normally open contacts connected in shunt to one of said windings and an operating coil adapted when energized to close said relay contacts, the serial arrangement of said operating coil and the contacts of said electrical switch being connected in shunt to said secondary winding, and a current sensitive interrupter exterior of said casing connected in one of said primary leads and responsive to a predetermined current in said one of said primary leads incident to operation of said relay to interrupt the circuit to said primary winding.

References Cited in the file of this patent

UNITED STATES PATENTS

| | | |
|---|---|---|
| 2,103,816 | Hart | Dec. 28, 1937 |
| 2,117,583 | Van Antwerp | May 17, 1938 |
| 2,337,829 | Lockie | Dec. 28, 1943 |
| 2,597,185 | Roeding et al. | May 20, 1952 |

FOREIGN PATENTS

| | | |
|---|---|---|
| 623,438 | Germany | Dec. 20, 1935 |
| 475,130 | Great Britain | Nov. 15, 1937 |
| 716,744 | Germany | Feb. 16, 1942 |